United States Patent
Grasso

(10) Patent No.: US 8,166,015 B2
(45) Date of Patent: Apr. 24, 2012

(54) WEB ADVERTISING MANAGEMENT METHOD

(75) Inventor: Francesco Grasso, Torrens Park (AU)

(73) Assignee: E-Channel Online Pty Ltd, Parkside (AU)

( * ) Notice: Subject to any disclaimer, the term of this patent is extended or adjusted under 35 U.S.C. 154(b) by 221 days.

(21) Appl. No.: 11/617,255

(22) Filed: Dec. 28, 2006

(65) Prior Publication Data

US 2008/0104031 A1     May 1, 2008

(30) Foreign Application Priority Data

Oct. 30, 2006   (AU) ................................ 2006233245

(51) Int. Cl.
   *G06F 17/30*   (2006.01)
(52) U.S. Cl. ................. 707/706; 707/999.003; 705/14.4
(58) Field of Classification Search ........................ None
   See application file for complete search history.

(56) References Cited

U.S. PATENT DOCUMENTS

| | | | |
|---|---|---|---|
| 6,381,597 B1 | 4/2002 | Lin | |
| 6,785,671 B1 | 8/2004 | Bailey et al. | |
| 2004/0186778 A1 | 9/2004 | Margiloff et al. | |
| 2005/0149390 A1 | 7/2005 | Scholl et al. | |
| 2007/0203903 A1* | 8/2007 | Attaran Rezaei et al. | 707/5 |
| 2007/0239530 A1* | 10/2007 | Datar et al. | 705/14 |
| 2007/0260520 A1* | 11/2007 | Jha et al. | 705/14 |

* cited by examiner

*Primary Examiner* — Jean B Fleurantin
*Assistant Examiner* — Anteneh Girma
(74) *Attorney, Agent, or Firm* — Greenblum & Bernstein, P.L.C.

(57) ABSTRACT

The invention relates to a method, system and computer program for management of paid advertisements displayed in response to a search query entered into a search engine. A vendor's inventory is discovered by reading from an inventory database. Search terms are determined for item categories in the inventory database, reading from fields of the inventory database. A user can specify additional or replacement search terms to be associated with a particular item. Advertisement sets are then created for items which are currently available or "in stock," each set containing an advertisement corresponding to an item, the associated search terms, and a landing page identifier. The landing page displays search results from the vendor's inventory database, relating to the corresponding item category for that advertisement.

23 Claims, 7 Drawing Sheets

| COUNTRY | COUNTRY | CUSTOM KEYWORD | CUSTOM KEYWORD | CUSTOM KEYWORD |
|---|---|---|---|---|
| Afghanistan | Afghanistan | Afghan | | |
| Albania | Albania | | | |
| Algeria | Algeria | | | |
| Angola | Angola | | | |
| Antigua and Barbuda | Antigua and Barbuda | Antigua | Barbuda | Carribean |
| Argentina | Argentina | South America | | |
| Armenia | Armenia | | | |
| Australia | Australia | Aussie | Oz | |
| Austria | Austria | | | |
| Bahamas | Bahamas | | | |
| Bahrain | Bahrain | | | |
| Bangladesh | Bangladesh | | | |
| Barbados | Barbados | Carribean | | |
| Belarus | Belarus | | | |
| Belguim | Belguim | | | |
| Bolivia | Bolivia | | | |
| Bosnia and Herzegovina | Bosnia and Herzegovina | Bosnia | Herzegovina | |
| Botswana | Botswana | | | |
| Brazil | Brazil | South America | | |

*Figure 4*

| Advertisement Set Feature | | Example Advertisement Set for Corresponding Item Category: 5 Star Hotels in Sydney |
|---|---|---|
| Advertisement | Title | Luxury Hotels |
| | Description | " 4 and 5 STAR Hotels Available in Sydney, Australia - Book Now" |
| | Display URL | www.vendorhomepage.com |
| Associated Search Terms | | hotel, hotels, accomodation, holiday, "5 star", luxury Sydney, New South Wales, NSW Australia, Oz, Aussie |
| Landing Page Identifier (Landing URL) | | www.vendorhomepage.com/searchresults?STAR RATING=5&COUNTRY=Australia&CITY=Sydney |
| Bid Amount | | $1.00 |

*Figure 5*

WEB ADVERTISING MANAGEMENT METHOD

FIELD OF THE INVENTION

The invention relates to the production of advertisements to be displayed in response to search queries entered into a search engine.

BACKGROUND OF THE INVENTION

Many Internet search engine services (for example Google or Yahoo!) allow users to search the Internet for information. A searcher typically enters a search query including a number of search terms, and the search engine returns a list of web pages that it has identified, which may contain relevant information. The search results are usually listed in a ranked order, with the results considered most relevant placed at the top of the list. For many search queries, the list of search results is large, and can only be displayed over many pages of search results.

Consumers often search the Internet for products or services they wish to purchase. These include CDs, DVDs, computers, cameras, airline tickets, hotels, and many, many other goods and services. Indeed, for every product or service offered over the Internet, there may be potential consumers searching for it.

There is a strong incentive for a goods or services vendor to have their web page displayed at or near the top of the list, or at least on the first page of search results. To accommodate this, search engine services therefore allow vendors to pay to have advertisements for their products displayed in response to search queries entered into a search engine. These paid advertisements are often listed in a separate part of the search results list, and may be specified as "sponsored links" or by a similar name.

A vendor who wishes to make use of this service provides the search engine service with an advertisement and search terms associated with the advertisement. When a search query is processed by the search engine, the search engine service identifies and displays the advertisements whose search terms most closely match the search query. When the advertisement is displayed, the searcher can click on the advertisement to follow a link to a "landing page," usually the home page of the vendor's website.

As an example, if a search query consists of the search terms "hotel" and "Lisbon", then hotel service providers who can offer hotels in Lisbon will want to display their advertisements. The hotel service provider could then submit an advertisement, associated with the search terms "hotel" and "Lisbon", to the search engine service. The advertisement would be linked to the vendor's website.

Generally, search engine services charge for these paid advertisements on a "per click" basis, and vendors will not want to be paying to attract searchers who are not interested in purchasing their goods or services. Accordingly, there is a need to target the search terms associated with the advertisement; for the example of a hotel service provider who only provides hotels in Lisbon, they will not want their advertisement to be displayed every time the search term "hotel" is entered, but only when more relevant search terms are also entered (for example, "Portugal" or "Lisbon"). They can also reduce wasted clicks by providing more information in their advertisements.

Many vendors have extensive ranges of products. Travel, retail and classified websites may stock an enormous range of products. Typically, these websites will have more than one thousand (or even more than a million) different inventory items. Furthermore, each inventory item or category may be associated with multiple search terms. Each advertisement will then need to be submitted for display through several different search engines, each of which may have a different required format. Clearly then, the management of these advertisements can be a very large task. The problem is exacerbated for products with short life cycles or variable price or availability. Accordingly, advertisers are often limited in the number of items they advertise and how they display the advertisements, simply because of the high labour cost involved in creating and maintaining the advertisements. Advertisers therefore often only advertise the most popular 2 to 10 percent of their products, and miss out on specifically advertising the other 90 to 98 percent of niche products.

It is accordingly an object of the present invention to make it easier to manage these advertisements.

SUMMARY OF THE INVENTION

In a first aspect of the present invention, there is accordingly provided a method of producing advertisements for display in response to search queries entered into a search engine service comprising:
- (a) selecting a plurality of item categories from an inventory database;
- (b) associating one or more search terms with each of the selected item categories; and
- (c) producing advertisement sets, each set comprising an advertisement for a corresponding selected item category, the one or more associated search terms, and a landing page identifier, the advertisement sets for submission to a search engine service for display of the advertisement when the associated one or more search terms are included in a search query entered into the search engine service.

Many different types of items may be advertised in accordance with the present invention. Furthermore, for the purposes of this specification, the term 'item' should not be limited to physical goods, such as cameras, whitegoods, automobiles etc. It may refer to any vendible good or service that may be contained within an inventory database, including hotel rooms.

An item category will include items that have common properties. These properties will be identified by fields of the inventory database. In fact, an item category could be any group of item(s) sharing common value(s) for one or more fields. For example, if a database contains a field for a make of vehicle, and a field for transmission type, then the item categories will be a category for each possible make, a category for each possible transmission type, and a category for each possible combination of make and transmission type. Indeed, an item category may even extend to items having a particular range of values in a field—for instance, year of manufacture between 1997 and 1999. Of course, not every item category need be selected for advertisement.

A search term need not be a single keyword. It may also be a particular phrase associated with an item category.

Preferably, (b) further comprises:
- (b1) identifying a field of the inventory database, wherein the field has a plurality of possible values, and the items in at least one selected item category have a common value for the field;
- (b2) setting the common value to be a search term;
- (b3) allowing a user to specify additional or replacement search terms for the common value; and (b4) associating the search terms with the at least one selected item category.

Depending on the selection criteria, all of the item categories in the inventory database may be selected. However, it is desirable that (a) further comprises:
- (a1) identifying a plurality of item categories from the inventory database;
- (a2) for each item category, determining from the inventory database whether it meets one or more selection criteria; and
- (a3) selecting item categories which meet the one or more selection criteria.

Preferably, the number of items currently available in an item category is a selection criterion, and only item categories which contain a predetermined number of available items are selected.

In this way, item categories that are not in stock are not advertised. It is a waste of both the consumer's time and the vendor's money to advertise products that are not in stock. The present invention identifies these unavailable items from an existing inventory database, and does not produce advertisements for them.

To further save a consumer's time and improve the relationship between the vendor and consumer, the landing page specified by the identifier in a particular advertisement set may be targeted to the corresponding item category. It can be very frustrating for a consumer to click on an advertisement, and then to subsequently need to search through the advertiser's website to find the item they wish to purchase. This can be even worse if they then find that the item is unavailable!

Accordingly, the landing page identifier preferably specifies a database query to the inventory database for the corresponding item category, and the landing page is a page of search results for the database query. The database query will of course specify the item category by requesting items having the value(s) of field(s) which are common to all items in the corresponding item category.

In a second aspect of the present invention, there is provided a computer system for producing advertisements for display in response to search queries entered into a search engine service comprising:
- a selector for selecting a plurality of item categories from an inventory database;
- an associator to associate one or more search terms with each of the selected item categories; and
- an advertisement producer for producing advertisement sets, each set comprising an advertisement for a corresponding selected item category, the one or more associated search terms, and a landing page identifier, the advertisement sets for submission to a search engine service for display of the advertisement when the associated one or more search terms are included in a search query entered into the search engine service.

The system and method above may allow a user to specify several creative forms for advertisements of the same item category.

In further aspects of the present invention, there is also provided a computer readable medium and computer program element for directing a programmable device to perform the steps of the above method. Yet further aspects of the present invention will be revealed throughout this specification.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF THE DRAWINGS

An illustrative embodiment of the present invention will be discussed with reference to the accompanying drawings wherein:

FIG. 4 is a screenshot from a computer system according to an embodiment of the present invention;

FIG. 5 shows in more detail an advertisement set according to an embodiment of the present invention;

DETAILED DESCRIPTION

Figure 1:
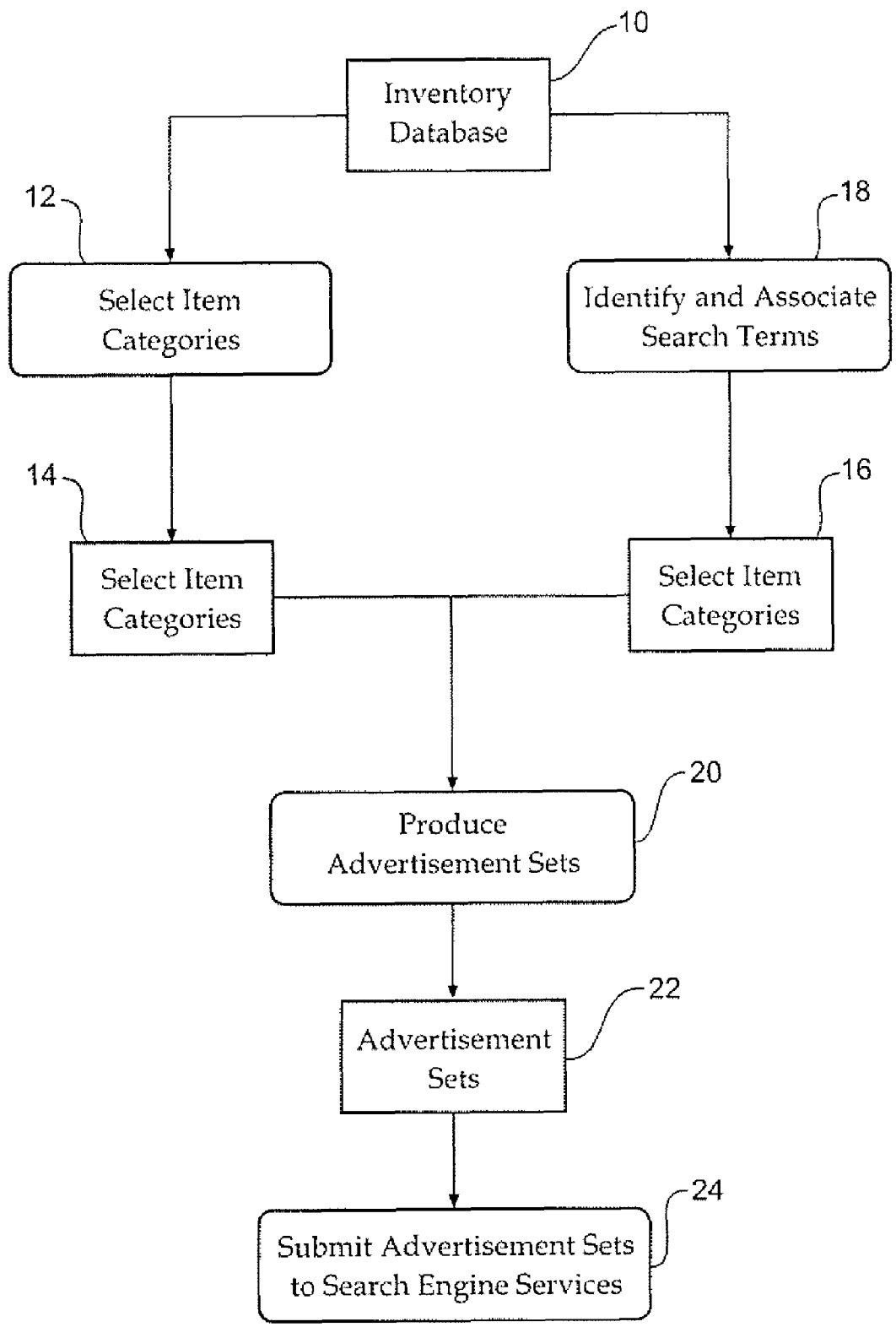
FIG. 1 is a diagram of an embodiment of the method of the present invention.

FIG. 1 depicts a method according to an embodiment of the present invention. An inventory database 10 contains items and various fields for each item. These fields may, for example, identify an item, identify properties of the item such which define whether an item is within a particular item category, or identify the availability of an item (for example how many are currently in stock).

As discussed above, the types of items contained in the inventory database 10 may include a broad range of goods and services, such as electronic equipment, airfares, hotel rooms or automobiles. Item categories are selected 12 from the inventory database 10. Furthermore, search terms 16 are identified from specified fields of the inventory database 10 and associated 18 with the selected item categories 14.

Advertisement sets 22 are then produced 20 for each selected item category 14. An advertisement set will comprise at least an advertisement for the corresponding selected item, the associated search term(s), and a landing page identifier.

The advertisement sets 22 are then submitted 24 to a search engine service, for display when the associated search term(s) are included in a search query entered into the search engine service. In accordance with this embodiment, the advertisement sets can be submitted to multiple search engine services.

Figure 2:
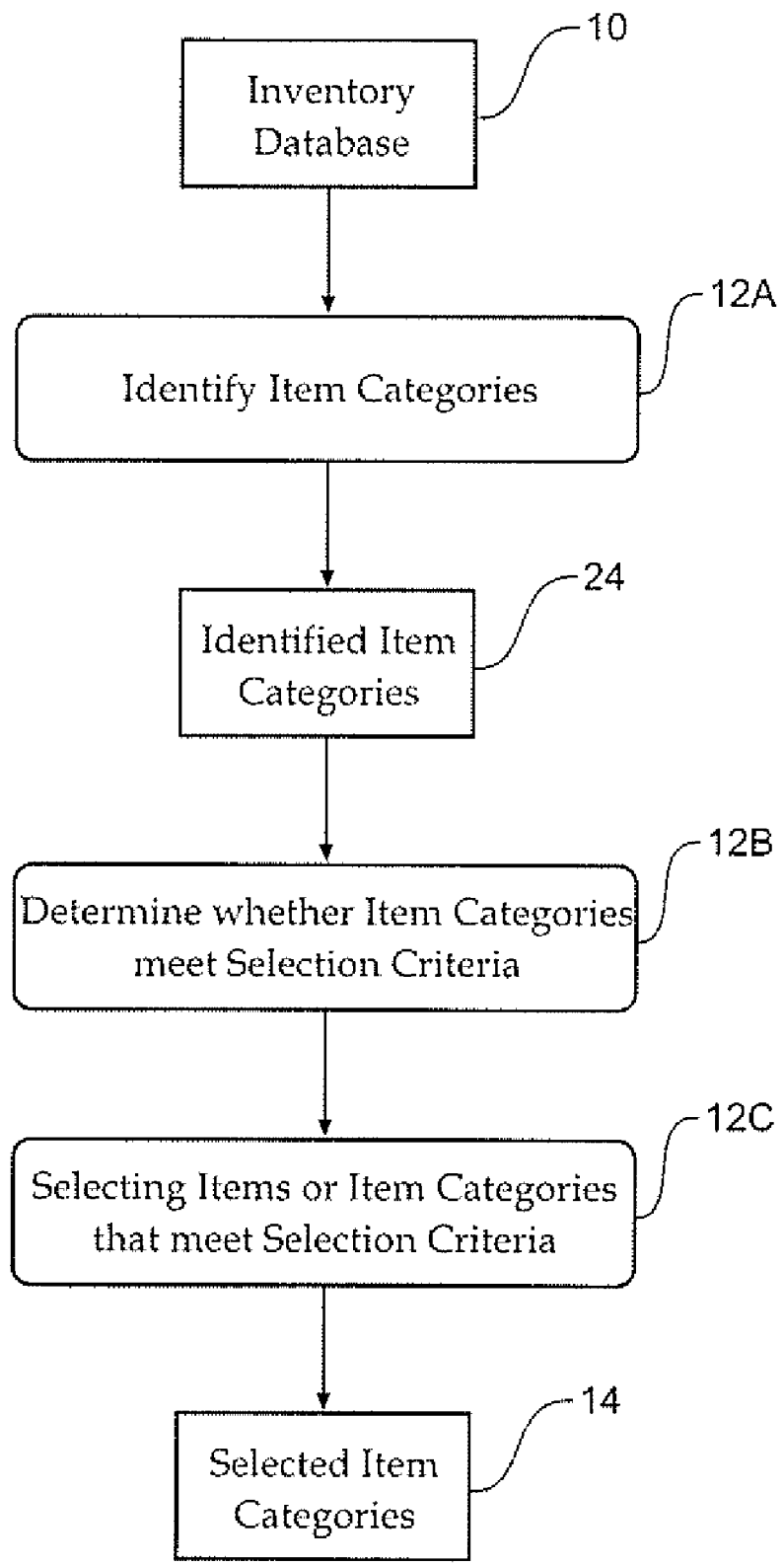
FIG. 2 shows in more detail how item categories are selected from the inventory database according to an embodiment of the method of the present invention.

FIG. 2 depicts in more detail how item categories are selected 12. First, item categories 24 are identified 12A from the inventory database 10. Then, item category 24 is checked to determine whether it is meets selection criteria 12B. One of these criteria will be whether the item is currently available. If this check determines that a particular item category 24 meets the selection criteria (i.e. if it is available), then that item category will be selected 12C. Otherwise, it will not be selected.

In this way, item categories that are not in stock are not advertised. It is a waste of both the consumer's time and the vendor's money to advertise products that are not in stock. This embodiment of the present invention identifies these unavailable items from an existing inventory database, and does not produce advertisements for them. Of course, it would be within the scope of the present invention to apply a different selection threshold such that, for example, only item categories for which there are more than 10 items in stock are selected.

Similarly, other criteria may be applied, for example such that only item categories which are priced above a certain threshold are selected. Vendors will not usually wish to advertise products for which the "per click" cost is greater than the price of the product. These selection criteria may be set or adjusted by a user.

Figure 3:
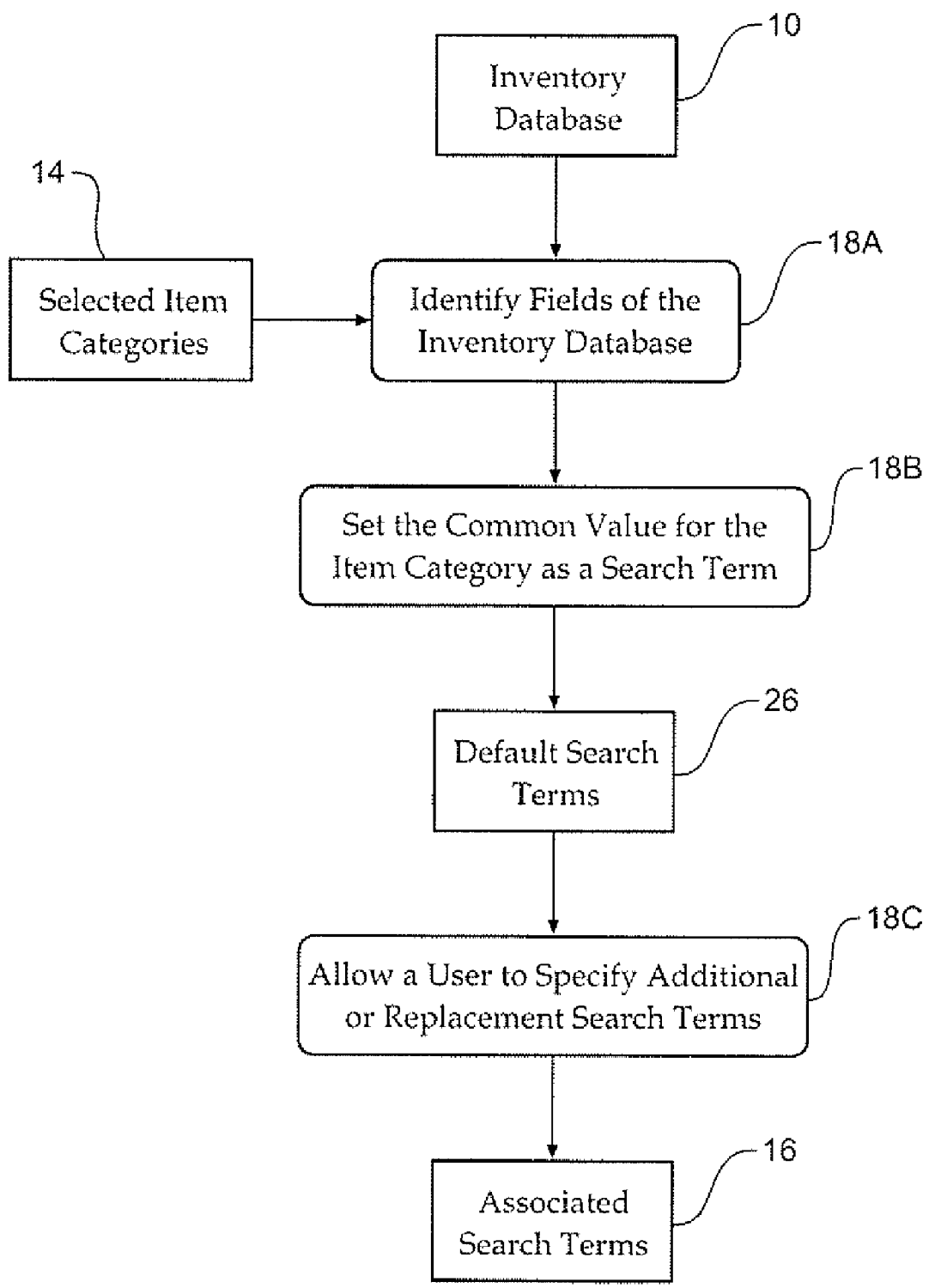
FIG. 3 shows in more detail how search terms are associated with the selected item categories according to an embodiment of the method of the present invention.

FIG. 3 depicts in more detail how search terms 16 are identified and associated with the selected item categories 12. For each selected item category 14, the fields of the inventory database 10 which define that item category are identified 18A. The values of these fields can be extracted as default search terms 26 and associated with the corresponding selected item category 14.

By identifying search terms from an existing inventory database, the task of producing advertisement sets is greatly simplified. For an automobile dealer, for example, search terms relating to the make, model, transmission, colour etc. of a vehicle can all be drawn straight from the inventory database. However, the information contained in the fields of the inventory database may not always be appropriate or sufficient to identify all of the relevant search terms. For instance, a field in a database may use a code or abbreviation. Similarly, many other search terms may also be relevant, such as synonyms for the field value. By way of example, a hotel service provider may, in their inventory database, use the code "AUS" to identify a hotels located in Australia. However, potential consumers are unlikely to use this abbreviation as a search term, and may use other search terms such as "Australia", "Oz", "Aussie" etc. Similarly, some fields in the inventory database may simply be true or false fields, to indicate the presence or absence of a particular feature. In this case, the value of the field will not be an appropriate search term.

Accordingly, this embodiment of the present invention allows a user to associate additional or replacement search terms 18C with each of the selected item categories 14. FIG. 4 depicts a screenshot 30 from a computer program according to an embodiment of the present invention. As can be seen, values of a field of the inventory database 10 are shown in the left-hand column 32. In this example, the items are hotel listings, and the field shown on the left are the possible values of a country field.

Listed in the cells of columns 33, adjacent each possible value, are search terms. Initially, the cells of the left-most of these columns 33 are filled with a default search term, which is the field value. However, a user may overwrite these default search terms if they wish. The cells of the subsequent columns 33 are also editable, which allows a user to enter alternative search terms for the field value. For example, the value Australia has "Australia," "Oz" and "Aussie" adjacent to it.

In addition to the search terms determined for a particular field value, there will usually also be other generic search terms associated with an item category. A hotel vendor, for example, may wish to associate additional generic search terms with every advertisement, such as "hotel" or "accommodation."

FIG. 5 shows the layout of an advertisement set according to this embodiment of the present invention, and also shows an example for a hotel room vendor. The item category in this instance is 5 star hotel rooms in Sydney, Australia.

The advertisement set includes an advertisement (having a title, a description and a Display URL ("Uniform Resource Locator")), as well as associated search terms. The search terms on the first line are generic search terms. The search terms on the second line relate to values of a "STAR RATING" field, the search terms on the third line relate to the value of a "CITY" field, and the search terms on the fourth line relate to the value of a "COUNTRY" field.

There is also a landing page identifier (or "landing URL"), which identifies a landing page which is targeted at the corresponding item category. In this instance, the landing page identifier specifies a database query to the vendor's inventory database, querying for the item category. The landing page will accordingly be a web page displaying the results of the database query.

The database query may be specified by the landing page identifier in many ways which are already known, so only one format for an identifier to specify a database query is shown in this example.

It should be pointed out that a vendor's website does not always allow all fields of a database to be searched. However, the database query specified by the landing page identifier need not be limited to querying fields of the database which are permitted using the vendor's website. Rather, the database query preferably queries all fields which are relevant to defining the corresponding advertised item category.

For instance, although an automobile dealer is likely to have the colour of a vehicle as a field in their inventory database, this field may not be searchable from their website. However, it is a field that a consumer may well enter into a search engine service—there is likely to be some keyword volume.

Traditionally, no specific advertisement for a particular colour of car would be produced, and the vendor would miss out on specifically advertising that particular item category. Furthermore, even if the advertisement were placed, the searcher might have no way of actually searching the vendor's website for that item category.

However, provided the information is contained in a field of the vendor's inventory database, the present invention allows a vendor to produce a targeted advertisement for any item category in their inventory. It is also able to present a consumer directly with the item category of interest. Furthermore, in this embodiment advertisements are only produced for available items, ensuring that irrelevant advertisements are not placed with a search engine service.

In this embodiment, as shown in FIG. 5, each advertisement set also contains additional information, being a bid amount which indicates how much will be paid for the advertisement (usually on a "per click" basis, but it may also be on a "per display" or other basis.)

The advertisements in the advertisement sets 22 may be produced to display values of fields of the inventory database 10; for example, "Great hotels in <country> priced from <price>", where <country> and <price> are fields of the inventory database 10. A single item category may have multiple corresponding advertisement sets, differing in the creative form of the advertisement. This means that the advertisements will appear differently; for example, the category of hotels listed above may take an alternative creative form such as "Stay in luxury in <country>—book <star rating> star hotels now" (<star rating> would be another field of the inventory database. By producing advertisements with different creative formats, this helps a user to experiment to find the format with the most consumer appeal).

Figure 6:
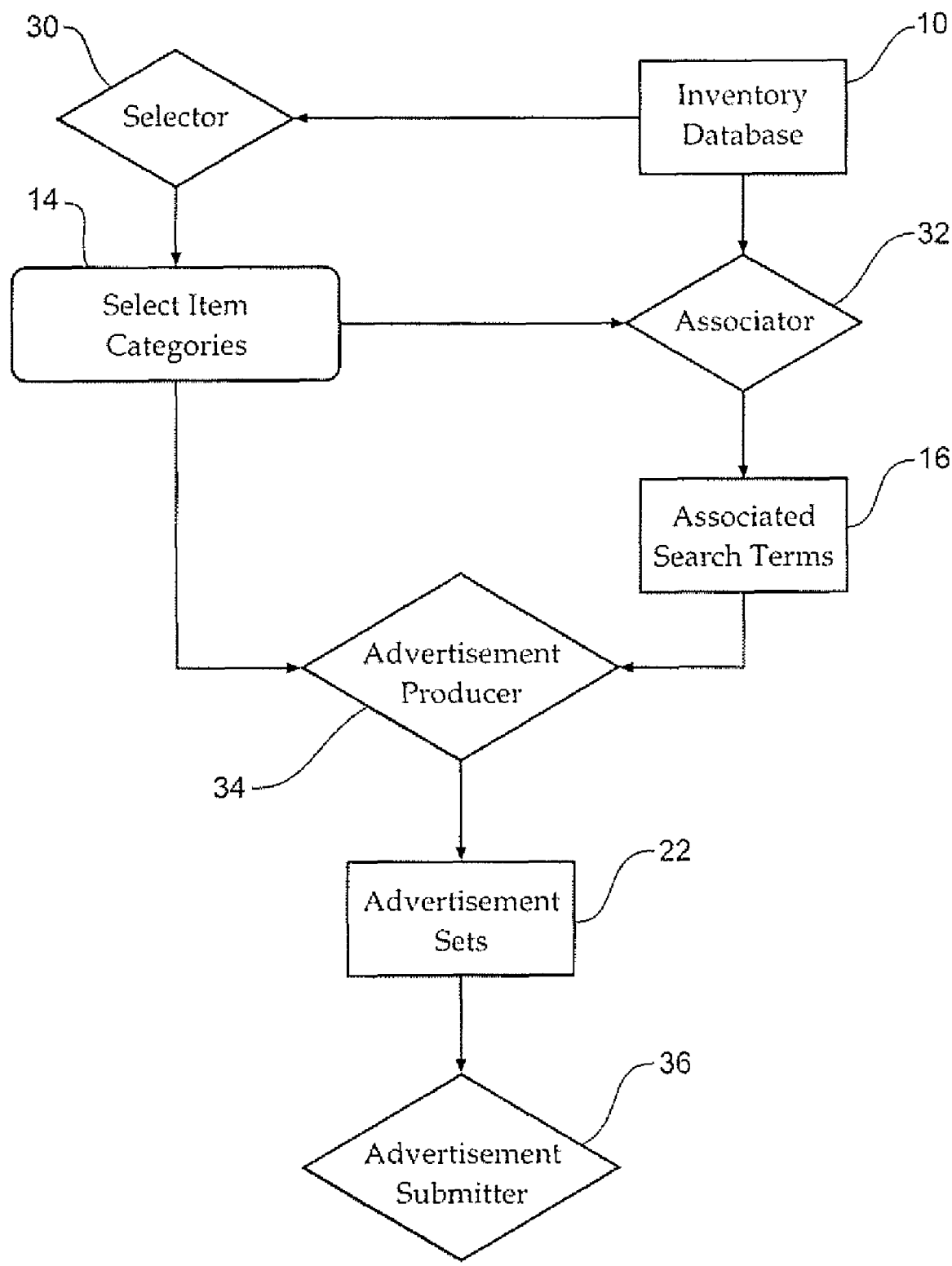
FIG. 6 is a diagram of a computer system according to an embodiment of the present invention.

A computer system according to an embodiment of the present invention is depicted in FIG. 6. A selector 30 selects item categories 14 from an inventory database 10. It will select item categories 14 which are available, and not select items which are unavailable.

An associator 32 identifies search terms 16 from the inventory database 10 and associates them with the selected item categories 14. The associator 32 also comprises means to allow a user to specify one or more search terms associated with an item category—for example editable text fields as shown in FIG. 4.

An advertisement producer produces an advertisement set 22 for each selected item category 14. These advertisement sets 11 are submitted to at least one (and normally more than one) search engine service, the advertisements for display when the associated one or more search terms are included in a search query entered into the search engine service.

The computer system also comprises means to allow a user to edit selection criteria for selection of item categories to advertise. These settings will allow a user to have additional input regarding the selection of items to be advertised.

Figure 7:
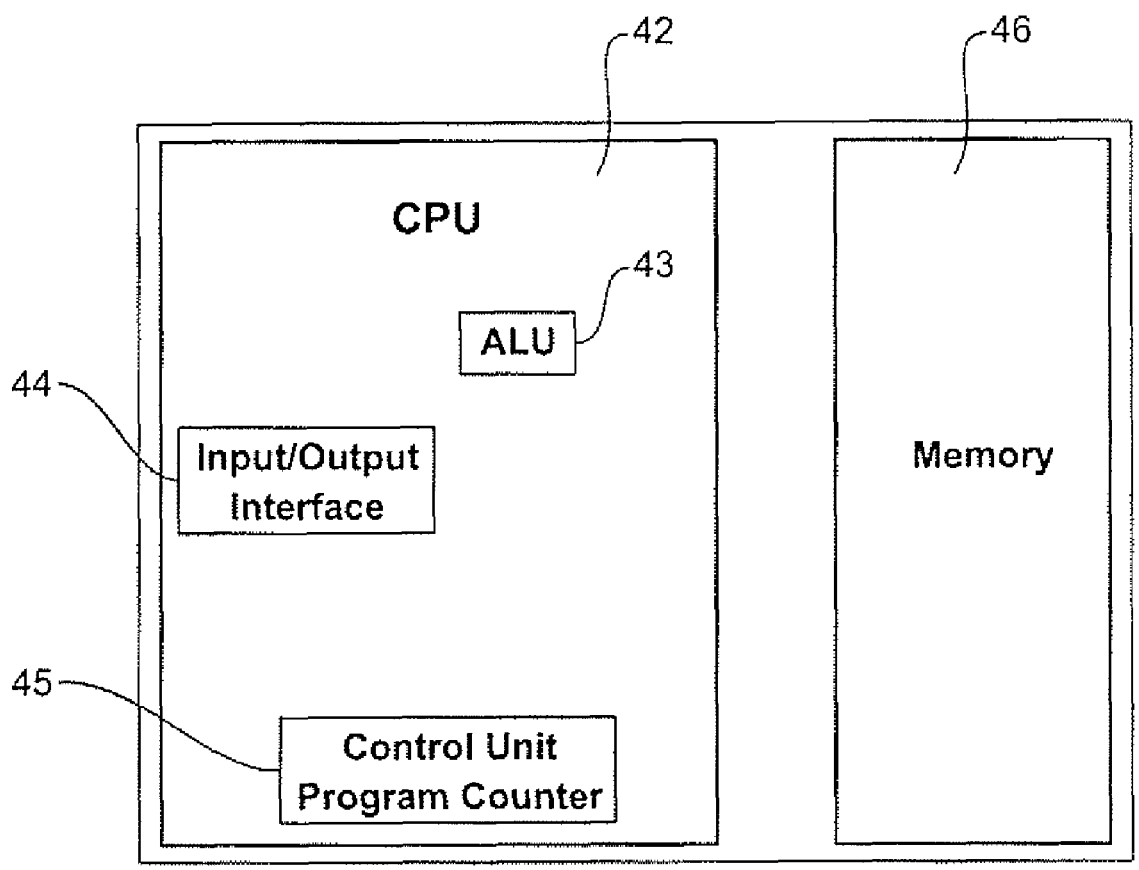
FIG. 7 is a general diagram of a computer architecture which could be used to implement the method and system of the present invention.

A computer implementing the present invention will typically will typically operate broadly under the architecture shown in FIG. 7, wherein a central processing unit (CPU) 42, containing an Input/Output Interface 44, an Arithmetic and Logic Unit (ALU) 43 and a Control Unit and Program Counter element 45 is in communication with input and output devices through the Input/Output Interface 44, and a memory 46.

As can be readily seen, the present invention provides numerous advantages. In particular, it makes it simple to produce advertisements for all item categories in a vendor's inventory. The method can easily be performed on a regular basis (for example, daily or monthly, as the vendor requires), allowing a vendor to keep their advertisements up-to-date without spending large periods of time managing the process. If new item categories are added or removed, the advertisement will no longer be produced, and money no longer wasted. Similarly, a vendor's budget is not spent advertising items which are unavailable.

The present invention also allows more targeted advertisements to be produced—rather than simply displaying general advertisements in response to a user query, advertisements produced according to the present invention can be very specifically targeted to a search query entered into a search engine. This can translate into more sales of the 90-98% of 'niche' products, that otherwise may not even be advertised. Furthermore, the consumer's time is also saved because the advertisement leads to a landing page targeted to the item category that the consumer was searching for.

This computer system also allows simple management of search engine advertisements by marketing staff, without requiring that they undergo significant specialised training.

Although an embodiment of the present invention has been described in the foregoing detailed description, it will be understood that the invention is not limited to the embodiment disclosed, but is capable of numerous rearrangements, modifications and substitutions without departing from the scope of the invention. Modifications and variations such as would be apparent to a skilled addressee are deemed within the scope of the present invention.

It should be noted that the order of the steps of disclosed processes may be altered within the scope of the invention. For example, it will be understood that the order of the steps may be rearranged to a certain degree, without departing from the scope of the invention. For example, advertisement sets 22 may be produced for all item categories in the database, but only submitted for items which are currently available.

It will also be understood that the search engine services need not be full web search engine services that search the entire content of the web. They could simply be search engine services available on other web sites, such as price comparison sites.

It should be appreciated that the present invention can be implemented in numerous ways, including as a process, an apparatus, a system, or a computer readable medium such as a computer readable storage medium or a computer network wherein program instructions are sent over optical or electronic communication links.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any prior art in this specification is not, and should not be taken as, an acknowledgment or any form of suggestion that such prior art forms part of the common general knowledge.

The invention claimed is:

1. A method of producing advertisements for display in response to search queries entered into a search engine service, comprising:
    selecting, using a computer, a plurality of item categories from an inventory database;
    associating one or more search terms with each of the selected item categories;
    producing advertisement sets, each set comprising an advertisement for a corresponding selected item category, the one or more associated search terms, and a landing page identifier, the advertisement sets being submitted to the search engine service for display of the advertisement when the associated one or more search terms are included in a search query entered into the search engine service, wherein said selecting comprises initiating a database query to the inventory database for the corresponding item category, and determining a quantity of inventory of available items of the corresponding item category, the database query being specified in the landing page identifier;
    initiating a database query to the inventory database for the corresponding item category, the database query being specified in the landing page identifier; and
    displaying, after said producing advertisement sets, a landing page of search results based on the initiated database query, the landing page identifier identifying the landing page.

2. The method according to claim 1, wherein associating further comprises: identifying a field of the inventory database, wherein the field has a plurality of possible values, and items in at least one of the selected item categories have a common value for the field;
    setting the common value to be a search term; and
    associating the search term with the at least one selected item category.

3. The method according to claim 1, wherein associating further comprises identifying a field of the inventory database, wherein the field has a plurality of possible values, and items in at least one of the selected item categories have a common value for the field;

setting the common value to be a search term;

allowing a user to specify additional or replacement search terms for the common value; and associating the search terms with the at least one selected item category.

4. The method according to claim 2, wherein identifying, setting, and associating are performed for each possible value of the field.

5. The method according to claim 2, wherein associating one or more search terms further comprises associating generic search terms with each item category.

6. The method according to claim 1, wherein selecting further comprises:

identifying the plurality of item categories from the inventory database;

for each item category, determining from the inventory database whether it meets one or more selection criteria; and selecting the selected item categories which meet the one or more selection criteria.

7. The method according to claim 1, wherein at least one of the selected item categories has a plurality of corresponding advertisement sets, with each advertisement of the plurality of corresponding advertisements sets having different creative forms.

8. The method according to claim 1, wherein the advertisements are produced to include the values of fields of the inventory database.

9. The method according to claim 1, further comprising: submitting the advertisement sets to the at least one search engine service.

10. The method according to claim 1, wherein the advertisement sets are produced for submission to multiple search engine services.

11. The method according to claim 10, further comprising: submitting the advertisement sets to the multiple search engine services.

12. The method according to claim 1, further comprising maintaining the inventory database by the entity creating the advertisement.

13. A non-transitory computer readable storage medium storing a computer program for producing advertisements for display in response to search queries entered into a search engine service, the computer readable storage medium comprising:

a selecting code, recorded on the computer readable medium, that selects a plurality of item categories from an inventory database;

an associating code, recorded on the computer readable medium, that associates at least one search term with each of the selected plurality of item categories;

an advertisement producing code, recorded one the computer readable medium, that produces advertisement sets, each set comprising an advertisement for a corresponding selected item category, the at least one associated search term, and a landing page identifier, the advertisement sets being submitted to a search engine service for display of the advertisement when the associated at least one search term is included in a search query entered into the search engine service;

an initiating code segment included in the selecting code, recorded on the computer readable medium, that initiates a database query to the inventory database for the corresponding item category, and that determines a quantity of available inventory items of the corresponding item category, the database query being specified in the landing page identifier; and a displaying code segment, recorded on the computer readable medium, that displays, after the advertisement sets are produced, a landing page of search results based on initiating the database query, the landing page identifier identifying the landing page.

14. The computer readable storage medium according to claim 13, wherein the associating code further comprises a specifying code, recorded on the computer readable medium, that allows a user to specify the at least one search term associated with an item category of the plurality of item categories.

15. The computer readable storage medium according to claim 13, further comprising an adjusting code, recorded on the computer readable medium, that allows a user to adjust one or more selection criteria, for selection of item categories of the plurality of item categories to advertise, and wherein the selecting code selects item categories of the plurality of item categories according to the one or more selection criteria.

16. The computer readable storage medium according to claim 13, further comprising: an advertisement submitting code, recorded on the computer readable medium, that submits the advertisement sets to the search engine service.

17. The computer readable storage medium according to claim 16, wherein the advertisement submitter submits the advertisement sets to multiple search engine services.

18. The computer readable storage medium according to claim 13, wherein the selecting code selects only item categories of the plurality of item categories for which the quantity of inventory of available items is at least a predetermined number.

19. An apparatus for producing an advertisement set for a corresponding item category, the advertisement set comprising:

a processor configured to produce an advertisement for display in response to a search query entered into a search engine;

at least one search term associated with the item category; and a landing page identifier that specifies a database query to an inventory database for a corresponding item category, wherein the processor is further configured to initiate a database query to the inventory database for the corresponding item category, the database query being specified in the landing page identifier, wherein a quantity of inventory of available items of the corresponding item category is determined, the landing page identifier identifying a landing page of search results obtained by initiating the database query.

20. A method of producing advertisements for display in response to search queries entered into a search engine service, comprising:

selecting, using a computer, a plurality of item categories from an inventory database;

associating one or more search terms with each of the selected item categories;

producing advertisement sets, each set comprising an advertisement for a corresponding selected item category, the one or more associated search terms, and a landing page identifier, the advertisement sets being submitted to the search engine service for display of the advertisement when the associated one or more search terms are included in a search query entered into the search engine service, wherein said selecting comprises initiating a database query to the inventory database for the corresponding item category, and determining a quantity of inventory of available items of the corresponding item category, the database query being specified in the landing page identifier; and advertising the item category, upon receipt of a search query including at least one of the one or more search terms by displaying, to a user, an advertisement for the item category.

21. A method of providing instructions to a computer, over a network, to produce advertisements for display in response to search queries entered into a search engine service, comprising:

providing instructions to select, using a computer, a plurality of item categories from an inventory database;

providing instructions to associate one or more search terms with each of the selected item categories;

providing instructions to produce advertisement sets, each set comprising an advertisement for a corresponding selected item category, the one or more associated search terms, and a landing page identifier, the advertisement sets being submitted to the search engine service for display of the advertisement when the associated one or more search terms are included in a search query entered into the search engine service, wherein said selecting comprises initiating a database query to the inventory database for the corresponding item category, and determining a quantity of inventory of available items of the corresponding item category, the database query being specified in the landing page identifier; and providing instructions to initiate a database query to the inventory database for the corresponding item category, the database query being specified in the landing page identifier; and providing instructions to display, after said producing advertisement sets, a landing page of search results based on the initiated database query, the landing page identifier identifying the landing page.

22. A method of producing advertisements for display in response to search queries entered into a search engine service, comprising:

selecting, using a computer, a plurality of item categories from an inventory database;

associating one or more search terms with each of the selected item categories;

producing advertisement sets, each set comprising an advertisement for a corresponding selected item category, the one or more associated search terms, and a landing page identifier, the advertisement sets being submitted to the search engine service for display of the advertisement when the associated one or more search terms are included in a search query entered into the search engine service wherein said selecting comprises initiating a database query to the inventory database for the corresponding item category, and determining a quantity of inventory of available items of the corresponding item category, the database query being specified in the landing page identifier; and displaying, after producing said advertisement sets, a landing page of search results based on the initiated database query, the landing page identifier identifying the landing page, wherein said selecting further comprises:
  identifying the plurality of item categories from the inventory database; and
  selecting only item categories of the plurality of item categories for which the quantity of inventory available items is at least a predetermined number.

23. A method of advertising an item category from an inventory database by:

selecting, using a computer, a plurality of item categories from the inventory database;

associating at least one search term with each of the selected item categories;

producing an advertisement set, using a computer, comprising an advertisement for the item category, at least one associated search term, and a landing page identifier;

submitting the advertisement set to a search engine service for display of the advertisement when the associated at least one search term is included in a search query entered into the search engine service, a searcher being enabled to follow a link associated with the advertisement to access a landing page; and providing, to the searcher and after said producing an advertisement set, a landing page comprising search results corresponding to a database query to the inventory database for the item category wherein a quantity of inventory of available items of a corresponding item category is determined, when the searcher follows the link.

* * * * *